(12) United States Patent
Li et al.

(10) Patent No.: US 8,971,930 B2
(45) Date of Patent: Mar. 3, 2015

(54) GEOFENCING SYSTEM AND METHOD

(71) Applicant: Research In Motion Limited, Waterloo (CA)

(72) Inventors: Andrew Andrey Li, Ottawa (CA); Khenaidoo Nursimulu, Kanata (CA); Mykhaylo Michael Reshetnyak, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/710,838

(22) Filed: Dec. 11, 2012

(65) Prior Publication Data

US 2014/0162692 A1 Jun. 12, 2014

(51) Int. Cl.
*H04M 3/42* (2006.01)
*H04W 24/00* (2009.01)
*H04W 4/02* (2009.01)
*H04L 29/06* (2006.01)

(52) U.S. Cl.
CPC ............... *H04W 4/021* (2013.01); *H04L 67/40* (2013.01)
USPC ..................................... 455/456.3; 455/414.1

(58) Field of Classification Search
CPC .......... H04W 4/02; H04W 4/04; H04W 48/04
USPC .......... 455/414.1, 456.1, 456.2, 456.3, 456.4, 455/456.5, 456.6
See application file for complete search history.

(56) References Cited

U.S. PATENT DOCUMENTS

| | | | |
|---|---|---|---|
| 7,848,765 B2 | 12/2010 | Phillips et al. | |
| 2008/0129491 A1 * | 6/2008 | Ruperto | 340/539.13 |
| 2010/0203901 A1 | 8/2010 | Dinoff et al. | |
| 2011/0208797 A1 | 8/2011 | Kim | |
| 2011/0256881 A1 * | 10/2011 | Huang et al. | 455/456.1 |
| 2012/0129553 A1 | 5/2012 | Phillips et al. | |
| 2012/0165044 A1 * | 6/2012 | Cedervall et al. | 455/456.3 |
| 2012/0172027 A1 * | 7/2012 | Partheesh et al. | 455/420 |
| 2012/0284769 A1 | 11/2012 | Dixon et al. | |
| 2013/0030931 A1 * | 1/2013 | Moshfeghi | 705/16 |
| 2013/0091452 A1 * | 4/2013 | Sorden et al. | 715/771 |

(Continued)

FOREIGN PATENT DOCUMENTS

| | | |
|---|---|---|
| EP | 1626350 A1 | 2/2006 |
| WO | 2010101979 A2 | 9/2010 |

OTHER PUBLICATIONS

Navigil Launches Programmable Tracking Device for Intelligent Track and Trace Applications—www.netprofile.fi/en/news?Article=2513.

(Continued)

*Primary Examiner* — Christopher M Brandt
(74) *Attorney, Agent, or Firm* — Gowling Lafleur Henderson LLP

(57) ABSTRACT

A computer-implemented method performed by a computing device having a processor operatively coupled to a memory, the method comprising storing a plurality of geofences in the memory along with addresses of servers associated with each of the geofences, receiving current location data from a mobile device, the current location data representing a current location of the mobile device, comparing the current location data with each of the plurality of geofences to determine whether data is to be obtained from one or more of the servers associated with each of the geofences, if the data is to be obtained, obtaining the data from the one or more servers, and transmitting the data to the mobile device.

23 Claims, 5 Drawing Sheets

(56) References Cited

U.S. PATENT DOCUMENTS

| | | | |
|---|---|---|---|
| 2013/0225196 A1* | 8/2013 | James et al. | 455/456.1 |
| 2013/0267224 A1* | 10/2013 | Krishnaswamy et al. | 455/426.1 |
| 2013/0310053 A1* | 11/2013 | Srivastava et al. | 455/446 |
| 2013/0326137 A1* | 12/2013 | Bilange et al. | 711/113 |

OTHER PUBLICATIONS www.rarewire.com/wpsite—Where Are You? Rare Wire, Jul. 12, 2012.

Extended European Search Report dated Jun. 6, 2013 from correspondence EP application.

* cited by examiner

GEOFENCING SYSTEM AND METHOD

CROSS-REFERENCE TO RELATED APPLICATIONS

This is the first application filed for the present technology.

TECHNICAL FIELD

The present technology relates generally to mobile devices and, in particular, to geofencing for mobile devices.

BACKGROUND

Geofencing is a technique for monitoring and providing an alert in response to the movement of a mobile device outside of a prescribed area around which a geofence is defined. A geofence is thus determined with reference to a geographical area. Location data from the mobile device are compared with the coordinate ranges of the geofence to determine whether the device is inside or outside the geofence. As the popularity of geofencing increases, so does the burden on the mobile device's resources, particularly its processing and memory capacity and also to a lesser extent its wireless bandwidth. A technique is therefore needed to more efficiently handle larger numbers of geofences.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
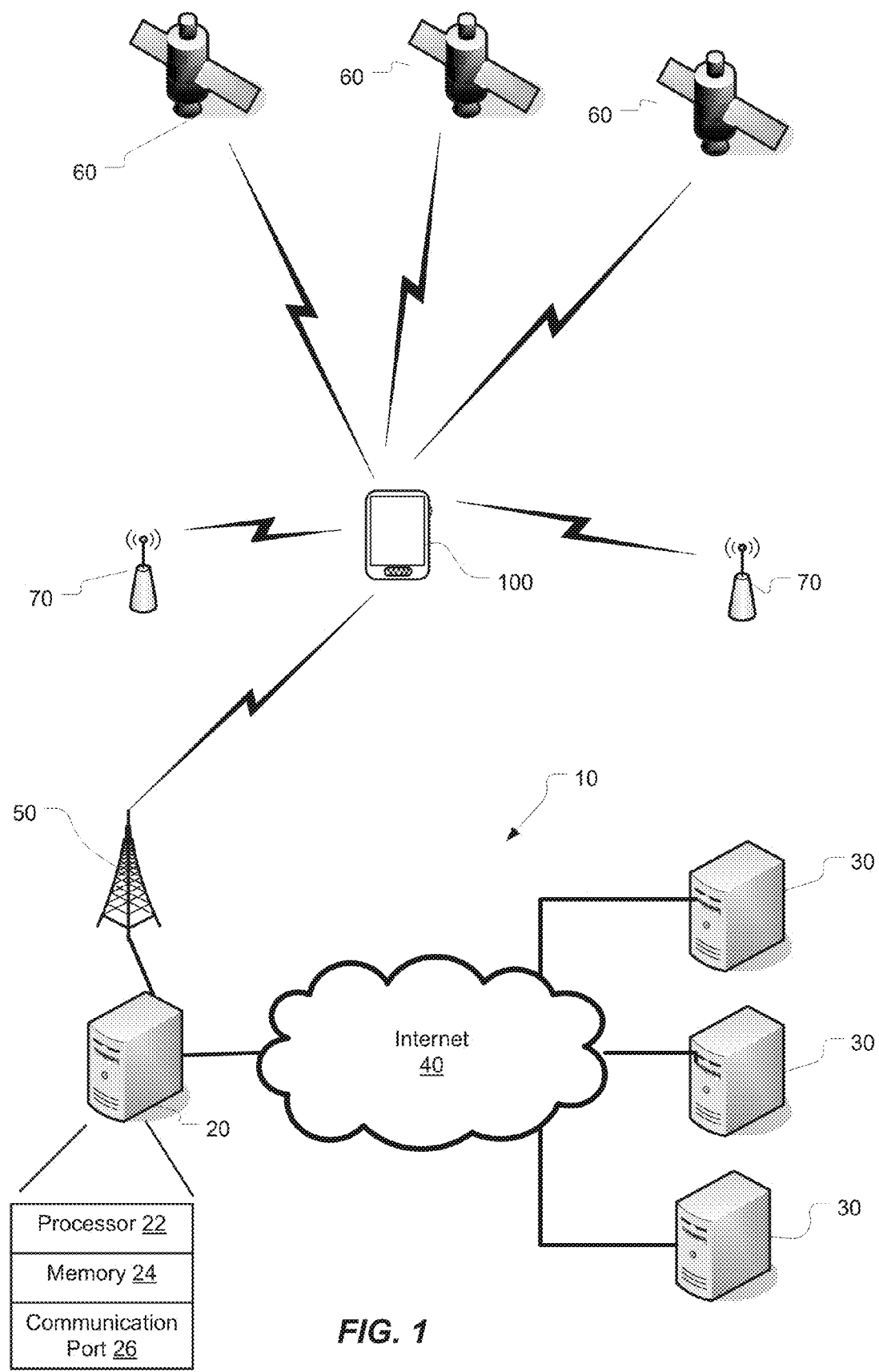
FIG. 1 is a schematic depiction of a system for performing geofencing actions for a mobile device.

The present technology relates in general to a geofencing server and a related computer-implemented method for performing geofencing actions as well as a computer-readable medium that stores instructions in code to cause a computing device to perform these geofencing actions. In general, the geofencing server, method and computer-readable medium enable a plurality of geofences to be implemented in a manner that is efficient for a mobile device. The geofencing server stores a plurality of geofences for the mobile device. In response to receiving current location data from the mobile device, the geofencing server determines whether any geofencing actions are required. These actions may include delivering location-specific content to the device for the device to use, store, display, etc. and/or delivering location-specific device-executable actions to the device for the device to perform. The geofencing server acts as a centralized proxy or hub that manages all of the geofences for the mobile device, obtains relevant data and delivers this data to the device. This alleviates the computational and memory burden which would otherwise be on the device.

Accordingly, one aspect of the present technology is a computer-implemented method performed by a computing device having a processor operatively coupled to a memory. The method entails storing a plurality of geofences in the memory along with addresses of servers associated with each of the geofences, receiving current location data from a mobile device, the current location data representing a current location of the mobile device, comparing the current location data with each of the plurality of geofences to determine whether data is to be obtained from one or more of the servers associated with each of the geofences. If the data is to be obtained, the method then includes a step of obtaining the data from the one or more servers and transmitting the data to the mobile device.

Another aspect of the present technology is a computer-readable medium comprising instructions in code which when loaded into a memory and executed by a processor of a computing device cause the computing device to store a plurality of geofences in the memory along with addresses of servers associated with each of the geofences, receive current location data from a mobile device, the current location data representing a current location of the mobile device, compare the current location data with each of the plurality of geofences to determine whether data is to be obtained from one or more of the servers associated with each of the geofences, and if the data is to be obtained, obtain the data from the one or more servers and then transmit the data to the mobile device.

Another aspect of the present technology is a geofencing server comprising a memory storing a plurality of geofences along with addresses of content servers associated with each of the geofences, a communication port for receiving current location data from a mobile device, the current location data representing a current location of the mobile device, and a processor, which is operatively coupled to the memory and to the communication port, for comparing the current location data with each of the plurality of geofences to determine whether data is to be obtained from one or more of the content servers associated with each of the geofences and if the data is to be obtained, to cause the geofencing server to obtain the data from the one or more content servers and, upon receipt of the data, to cause the geofencing server to transmit the data to the mobile device.

Another aspect of the present technology is a mobile device comprising a memory coupled to a processor for executing a geofence daemon that is configured to trigger a geofencing action in response to receiving a geofence condition notification from a geofence server, a location manager executed by the processor for providing location data to the geofence daemon for communicating to the geofence server, and an invocation manager executed by the processor for invoking an application on the mobile device in response to an action signal from the geofence daemon.

Yet another aspect of the present technology is a method, performed by a mobile device, of using geofences to obtain data. The method entails receiving a plurality of geofences, generating current location data representing a current location of the mobile device, comparing the current location data with each of the plurality of geofences to determine whether data is to be obtained from one or more servers associated with each of the geofences, and if the data is to be obtained, obtaining the data from the one or more servers by transmitting a request to a geofencing server that obtains the data from the one or more servers and then transmits the data back to the mobile device.

The details and particulars of these aspects of the technology will now be described below, by way of example, with reference to the drawings.

FIG. 1 is a schematic depiction of a system for performing geofencing actions. As depicted in FIG. 1, the system, which is generally denoted by reference numeral 10, includes a geofencing server 20 connected via one or more data communication links to a plurality of content servers 30. The geofencing server may communicate with the content servers via a data network such as the Internet using TCP/IP or any other suitable data packet-switching protocol. HTTP requests to the content servers may be sent by the geofencing server to retrieve content from the content servers.

As shown in FIG. 1, the geofencing server 20 is also connected to a mobile device 100. The geofencing server may communicate with the mobile device through a data network, e.g. the Internet 40, and via a wireless network that includes a base transceiver station 50 for radiofrequency communication with the mobile device using GSM, LTE, CDMA or any other cellular technology. Data packet transmission over the air may be accomplished using GPRS, EDGE, Evolved EDGE, HSPA, etc.

As further shown in FIG. 1, the geofencing server includes a processor 22, a memory 24, and a communication port 26 (e.g. a modem). Instead of a single geofencing server there may be a server cluster, server farm or cloud environment functioning as the geofencing server in other embodiments.

As further depicted in FIG. 1, GPS (or other GNSS) satellites 60 transmit RF signals to the mobile device 100 to enable the mobile device to obtain a position fix (i.e. generate current location data representing the current location of the mobile device). Current location data may also be obtained using other techniques, e.g. Wi-Fi positioning based on nearby Wi-Fi routers 70. Other radiolocation techniques may be employed to determine location data, e.g. using cellular RF signals from the nearby base station transceiver(s) 50.

Figure 2:
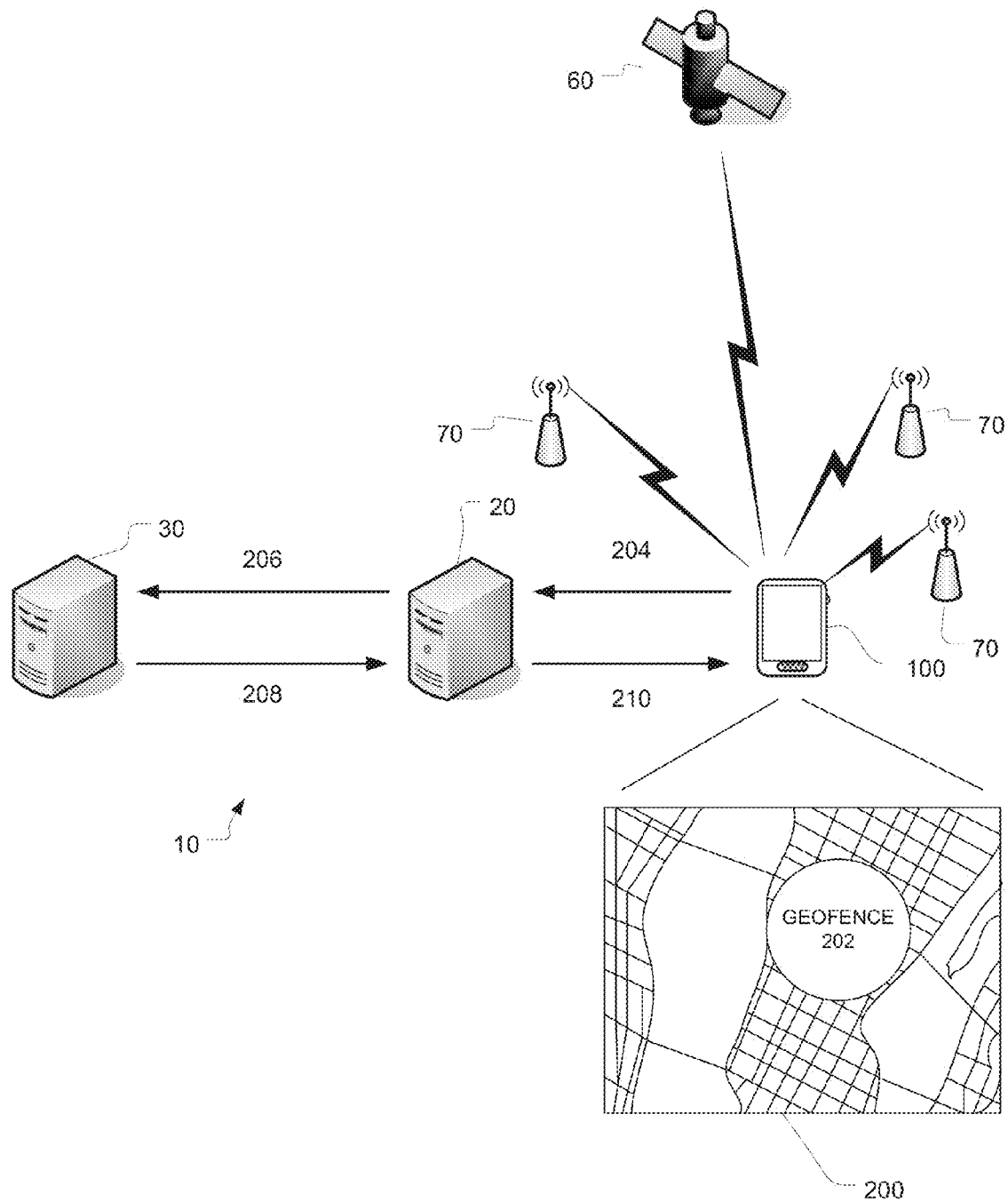
FIG. 2 is a schematic depiction of the data flow in the system.

FIG. 2 depicts the data flow (or message flow) in the system of FIG. 1. In this example, there is a circular geofence 202 for an area in a city or metropolitan area although the shape of the geofence and the fact that it is in a city or metropolitan area (as opposed to a suburban or rural area) is arbitrary. This geofence may be drawn by the user or selected from predetermined geofences by the user. The geofence may also be displayed on a map 200 of the city or area to enable the user to view the extent or scope of the geofence. In operation, the mobile device determines its current location based on signals from the GPS satellites 60 or Wi-Fi routers 70 (or by using other position-determining techniques). The mobile device transmits current location data (message 204) to the geofencing server 20. The message 204 may be sent periodically, intermittently or based on a schedule. The geofencing server 20 receives the location data from the mobile device, determines whether any geofence conditions are met (the device has entered a geofence, has left a geofence, has continued to remain inside a geofence, etc.) The geofencing server then obtains the data required for the geofence. This data may be cached at the geofencing server but in most cases the geofencing server will obtain this required data from one or more content servers. A request 206 is thus sent by the geofencing server 20 to the appropriate content server 30. A response 208 is sent back from the content server 30 to the geofencing server 20 which may cache this data for the mobile device. The geofencing server then sends or pushes the data (via message 210 in the form of a datagram or data packets) to the mobile device 100 either immediately upon receipt from the content server, based on a push schedule or in response to a request from the mobile device to download any available data. The mobile device 100 then uses or displays the content or performs any device-executable actions.

Figure 3:
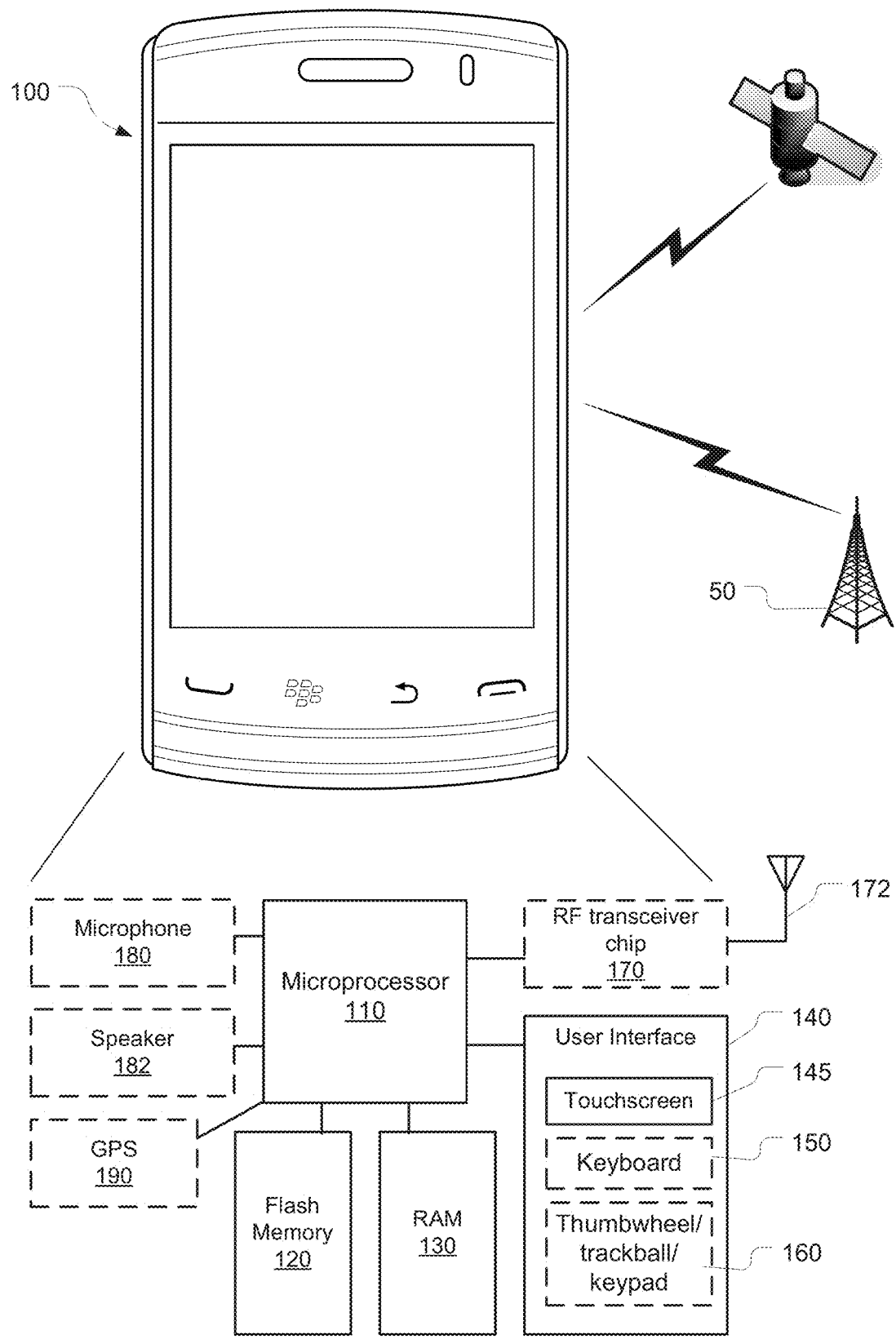
FIG. 3 is a depiction of a mobile device on which the present technology may be implemented, the depiction including a schematic depiction of some components of the mobile device.

FIG. 3 is a depiction of a wireless communications device as one example of a mobile device that may be used in conjunction with the geofencing server to implement this novel technology. Examples of a mobile device or wireless communications device include cell phones, smart phones, mobile phones, portable digital assistants, tablets, notebooks, laptops, or any other such portable or handheld electronic communications devices.

As shown by way of example in FIG. 3, the mobile device 100 includes a processor 110 and memory 120, 130 for executing one or more applications. The memory may include flash memory 120 and/or random access memory (RAM) 130. Other types or forms of memory may be used.

As depicted by way of example in FIG. 3, the mobile device 100 includes a user interface 140 for interacting with the mobile device and its applications and, in this instance, for receiving user input to set up a call to another device. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 3, the mobile device 100 may include a wireless transceiver 170 connected to an antenna 172 for communicating with other devices. The transceiver 170 may be a radiofrequency (RF) transceiver for wirelessly communicating with one or more base stations 50 over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls, the mobile device 100 includes a microphone 180, a speaker 182 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input.

Optionally, the mobile device 100 includes a positioning subsystem such as a Global Navigation Satellite System (GNSS) receiver which may be, for example, a Global Positioning System (GPS) receiver 190 (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the mobile device 100 may include a Wi-Fi™ transceiver, a Bluetooth® transceiver, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass and/or a tilt sensor or accelerometer.

The mobile device 100 interacts with the geofencing server 20 by determining its current location and by sending current location data to the geofencing server to enable the geofencing server to assess whether any geofence-related conditions have been triggered by the location or movement of the mobile device. The mobile device 100 may use its position-determining subsystem such as the GPS receiver 190 to generate current location data. The RF transceiver 170 of the mobile device transmits the current location data to the geofencing server which then compares the location data against the geofences to determine what data, if any, to send back to the mobile device.

The mobile device 100 may be used to create or define the geofences and to send these device-created (user-defined) geofences to the geofencing server for storage and management (location monitoring and data-retrieval). Defining geofences on the mobile device may be accomplished by using a graphical tool having a circular or polygonal shape or a lasso tool to draw an area on a map displayed on the display screen of the device. Alternatively, geofences may be defined using predetermined geographical entities, e.g. a city, district, state, province, country, postal code, area code, etc. Alternatively, geofences may be defined by entering a range of coordinates or street addresses to define one or more city blocks. The mobile device may optionally execute a geofence management application that enables the mobile subscriber (device user) to interact with all geofences applicable to the device (e.g. to view, create, edit, delete, activate, inactivate, filter, create rules, impose conditions, etc.)

The mobile device may also obtain pre-defined third-party geofences (i.e. geofences that have been already created by stores, boutiques, restaurants, cafes, hotels, bars, casinos, car rental companies, movie theatres, theme parks, museums, government agencies, etc.). These may be offered to the mobile device and accepted (downloaded). Alternatively, the mobile device user may proactively download any of these predefined geofences by visiting corporate or government websites which offer predefined geofences for content, e.g. location-based advertising, and/or for prescribed device-executable actions.

The processor of the mobile device is also configured to receive data from the geofencing server, to recognize the nature of this data as either content or device-executable actions. For content, the processor of the device then uses the content in some way (e.g. stores the data, displays the content, etc.). For device-executable actions, the device performs the action, e.g. activates a hardware component, shuts down a hardware component, transmits data, switches a device setting, notification profile, etc.

An example will now illustrate the usefulness of this novel geofence technology and how it can provide a rich user experience for the mobile device user without unduly burdening the resources of the mobile device. In this example, a mobile subscriber downloads a geofence from a movie theater's website. When the device enters the area defined by the geofence, which may be the vicinity of the movie theater, the geofencing server recognizes that the location of the device is within the geofence of the movie theater. The geofencing server sends data to the device representing a device-executable action that causes the device to automatically launch a web browser and load the webpage of the movie theater to thereby retrieve the show times for the user. The device thus displays the show times webpage to the user without the user having to do anything. Furthermore, the processing required to track the device and determine if one its plurality of geofences has been entered is done by the server, thus alleviating the computational burden on the device.

In the example, the user may then browse the movies and purchase a ticket using the mobile device. The geofencing server may have concentric geofences, one for the area around the theater and one corresponding to the theater itself. As the device enters the inner geofence corresponding to the movie theater itself, the geofencing server sends data representing a second device-executable action to the device to cause the device to automatically put the device into silent mode or vibration mode. Thus, this example illustrates the concept of concentric of layered geofences for the same commercial establishment or POI (point of interest), an outer geofence for advertising and inner geofence for customers inside the premises. Alternatively, the geofencing server could have inferred that the user was inside the theater by observing the length of time that the device lingers inside the geofence. In such a case, one action is sent immediately on entering the geofenced area and a second action is sent if the device remains within the geofenced area for at least a predetermined period of time.

Some of the geo-fencing actions may be user customized actions. For example, the user may configure an account or device profile at the geofencing server to send additional device-executable actions if the device is at an event (movie, show, sports event, dinner, conference, seminar, etc.). In that case, the geofencing server, in response to user settings in the profile stored at the server, may send additional device-executable actions. For example, a device-executable action may cause the device to place a calendar entry into the user's shared calendar indicating that the user is unavailable. Another device-executable action may cause the device to send a message to a social network site to update the user's profile to indicate what movie the user is watching. Another action may cause the device to send another message to a second social network site to check in the user at the movie theater.

Other actions may be time-dependent. Two minutes before the movie starts, the device downloads content in the form of a review of the movie from the user's favorite newspaper, downloads a friend's social network review about the movie and delivers Tweets relating to the movie.

In the foregoing example, the geofence has triggered all of these actions and content downloads without any user input or intervention. In this system, the geofences and user profile are stored and monitored at the server, not on the device, thus minimizing the impact on the processing and memory resources of the device.

Figure 4:
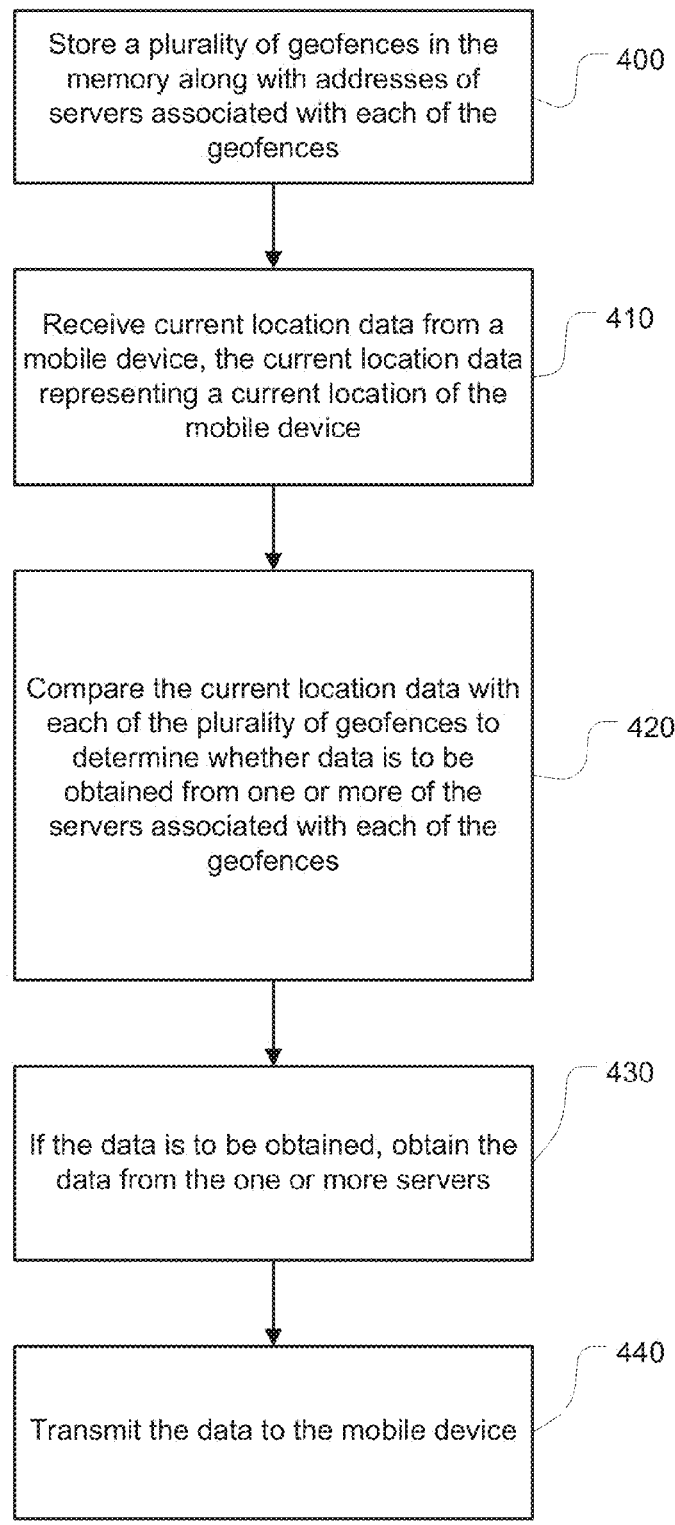
FIG. 4 is a flowchart depicting main steps of a method of geofencing.

FIG. 4 is a flowchart depicting steps, acts or operations of a computer-implemented method of geofencing. The computer-implemented method is performed by a computing device, e.g. the geofencing server 20 described above, having a processor operatively coupled to a memory and further including a communication port for communicating with the mobile device and with content servers. As depicted in FIG. 4, the method entails a step 400 of storing a plurality of geofences in the memory along with addresses of servers associated with each of the geofences. In other words, the memory of the geofencing server (computing device) stores a Uniform Resource Locator (URL) with a domain name or IP address followed by the port number, path, query string, and an optional fragment identifier. In some embodiments, there may be multiple addresses for a given geofence. For example, the memory may store a table such as the exemplary table shown in Table 1 below. The table may include a status of the geofence as also shown by way of example in Table 1, i.e. whether the geofence is active or inactive. Each geofence may be activated or deactivated in response to user input received from the mobile device and transmitted to the geofencing server. The status may also be configured more generally using a settings and options page on the mobile device that can prescribe the conditions under which certain geofences are to be active or inactive (time of day, day of the week, whether roaming or not, battery level, etc.)

TABLE 1

| GEOFENCE | STATUS | ADDRESS |
|---|---|---|
| A | ACTIVE | http://www.webserviceabc.com/scheduledata |
| B | INACTIVE | http://www.webservicedef.org/weatherdata |
| C | ACTIVE | http://www.webservicehij.biz/sportsdata |

As further illustrated in FIG. 4, the method includes a step 410 of receiving current location data from a mobile device, the current location data representing a current location of the mobile device. The method further includes a step 420 of comparing the current location data with each of the plurality of geofences to determine whether data is to be obtained from one or more of the servers associated with each of the geofences. The decision as to whether or not data is to be obtained may be based on any one of various conditions. For example, data may be obtained when a device crosses into a geofenced area or when the device leaves a geofenced area. The data-retrieval condition may also depend on the device remaining, staying or lingering in the geofenced area for more than a predetermined period of time. Updates may be obtained for devices that remain inside a geofenced area. In other embodiments, predictive downloading may be used to predict that a device is about to enter a geofenced area.

If the data is to be obtained, the method proceeds (as shown in FIG. 4) by performing a step 430 of obtaining the data from the one or more servers. Obtaining data includes sending a web request to the server and receiving a response from the server. At step 440, the method transmits the data to the mobile device. The data may be transmitted automatically or, alternatively, a notification is sent to the mobile device advising the user of the mobile device that there is data at the geofencing server available for download. The nature of the data may be described in the notification to permit the user to decide whether or not the data should be downloaded. The notification may include options to download the data, hold the data at the geofencing server or delete/purge the data from the geofencing server. Whether the download is automatic or in response to a user prompt may be user configured.

In one implementation, the data comprises one or more device-executable actions to be executed by the device. These device-executable actions may be to open or close an application or to activate or deactivate a hardware component. For example, the device-executable action may be to open a browser and to download HTML data from a website. As another example, the device may receive data representing a device-executable action to cause the device to deactivate a camera when arriving within a geofence at a customs hall at an airport.

In another implementation, the data comprises location-based content. Examples of location-based content include location-based advertising (with e-coupons), local news, local weather, local traffic reports, notifications about nearby friends or contacts, social networking content that is location-specific (i.e. relevant to a certain location). This content may be displayed, presented, played, saved, stored, etc. either automatically or in response to user input.

With large numbers of geofences, some of the geofences may overlap or partially overlap. In such cases, there may be two or more geofences that have device-executable actions that are contradictory or conflicting. For example, geofence A may activate a camera whereas geofence B, which is partially overlapping with A, may deactivate the camera. It is thus useful for the geofencing server to be able to resolve conflicts between device-executable actions received from two or more overlapping geofences.

Similarly, the geofencing server is optionally capable of prioritizing geofences. When a device enters a new area or is turned on, the geofencing server may need to obtain data for multiple geofences. In that case, prioritizing the geofences is useful. For example, the geofencing server may obtain data for geofence D, then geofence B, then geofence Y, etc. The order of priority may be user-reconfigurable so that the user of the device can specify which geofences are most important. The geofences can also be classified or categorized as high priority, medium priority, and low priority. It is also possible to filter out some of the low-priority geofences when roaming. The device and/or the geofencing server may automatically, or in response to user input, deactivate certain geofences when roaming to minimize data charges.

In one implementation, obtaining the data comprises sending an anonymous request as a proxy server on behalf of the mobile device. In other words, the privacy of the mobile subscriber associated with the mobile device may be protected by anonymizing the data request to the content server by removing any unique device identifiers (e.g. IMSI) or subscriber name from the request so that the content server can identify the requesting device or associated subscriber. In other embodiments, the subscriber name, device unique identifier, username, password, access code, authentication token, etc. may be transmitted to authenticate the request to access a private web server, e.g. a corporate web server or a paid web service requiring login credentials to access the content.

In another implementation, the geofencing server may group or link mobile devices to common or recurring geofences for improved efficiency. In other words, the geofencing server may maintain a database of all geofences and which mobile devices use which geofences. For example, data for a common geofence that is used by multiple mobile devices may be cached at the geofencing server and delivered to different mobile devices when their respective geofence conditions are met rather than to process each geofence condition individually by making individual requests to each content server. For example, if mobile device A enters a common geofence shared with mobile device B, the data is obtained, cached and delivered by the geofencing server to mobile device A. If mobile device B then enters the same common geofence, e.g. a few minutes later, the geofencing server may deliver the same data to mobile device B without making a new request to the content server. The geofencing server may refer to data timestamps to determine whether the cached data is fresh enough to deliver or whether it has gone stale in which case the geofencing server must make a new request to the content server to obtain fresh data.

Figure 5:
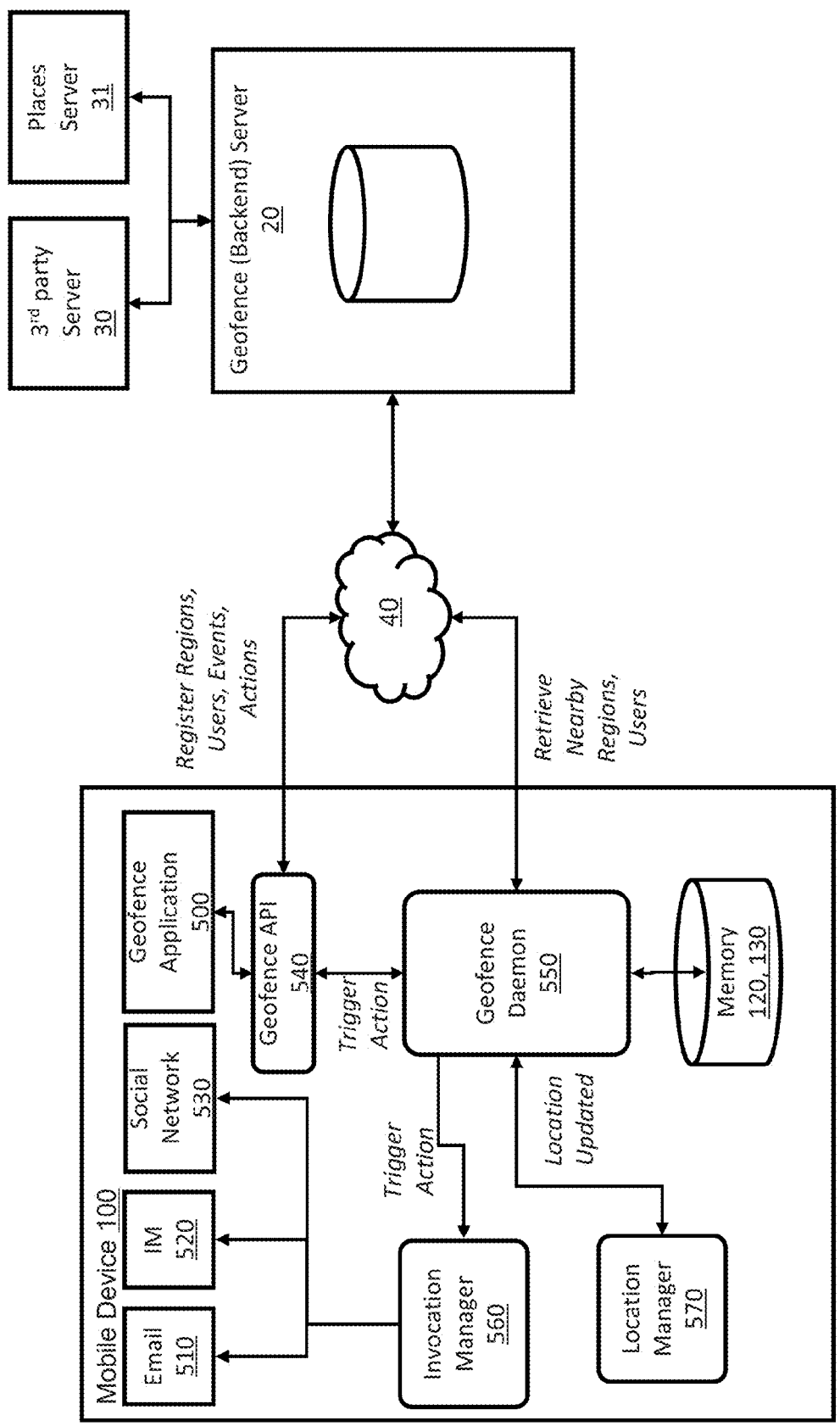
FIG. 5 is a schematic depiction of the geofence service architecture of one exemplary implementation of a geofencing system.

FIG. 5 schematically depicts a geofence service architecture for a geofence system. As depicted by way of example in FIG. 5, the mobile device 100 includes local storage, i.e. memory 120, 130 operatively coupled to a processor (not shown in this figure for the sake of simplicity) that is configured to execute various applications that interact with the geofence backend server 20 as will be explained below. As shown by way of example in FIG. 5, the mobile device 100 executes a geofence application 500 that enables a user to create, edit, and delete geofences, to activate or deactivate defined geofences, to set priorities or rules for resolving conflicts relating to overlapping geofences, or to accept or reject predetermined geofences imported by the mobile device 100. As described earlier, the geofences are stored at and monitored by the geofence server 20 which interacts with the mobile device 100 (to alleviate the computational burden on the device) to cause various actions to be performed by the mobile device 100 as will now be described.

As depicted by way of example in FIG. 5, the geofence application 500 interfaces via a geofence API (application programming interface) 540 with a geofence daemon 550. The geofence daemon 550 is a computer program or set of code that runs as a background process without user intervention. Specifically, as shown in FIG. 5, the geofence daemon interacts with an invocation manager 560 and a location manager 570 to invoke applications 510, 520, 530 when location data managed by the location manager 570 indicates that one or more geofence conditions are met. In other words, the location manager 570 executed by the processor provides location data to the geofence daemon for communicating to the geofence server. In one implementation, the geofence daemon 550 periodically polls the location manager 570 to pull location updates from the location manager although, in other implementations, the location manager may automatically push updates to the geofence daemon. The location manager may receive location data from a position-determining subsystem, e.g. a GPS receiver in the mobile device.

The geofence application 500 and the associated API 540 enable creation of geofences (i.e. registration of regions, users, events, actions, etc.) Creating or defining geofencing by registering regions, users, events, actions can be done by receiving user input within the geofence application 500. The geofence API 540 communicates the registered data for regions, users, events, actions, etc. via the Internet 40 to the geofence server 20 for monitoring of the geofences. Registration may also trigger an action signal to the geofence daemon 550.

The geofence daemon 550 retrieves nearby regions, users, events, actions, etc. by receiving a geofence condition notification from the geofence backend server 20 when a geofence condition is met. In other words, the geofence daemon 550 is configured to trigger a geofencing action in response to receiving a geofence condition notification from the geofence server 20. The server 20 obtains data from third-party servers 30 or a places server 31 which stores a consolidation of all place-related data for specific places. The geofence backend server 20 may be implemented as cloud storage (i.e. implemented on a cloud computing environment).

By way of example, FIG. 5 shows three applications: an e-mail application 510, an instant messaging (IM) application 520, and a social networking application 530, e.g. Facebook®, Twitter®, etc. These example applications and any other location-based services may use geofences to regulate various functions, notifications, and the like. These geofence-using applications 510, 520, 530 interact with an invocation manager 560 that invokes one or more of these applications 510, 520, 530 in response to action signals, instructions, commands or messages received from a geofence daemon 550 which has received a geofence condition notification from the geofence server 20. The geofence daemon 550 triggers an action signal and communicates this action signal to the invocation manager 560. The invocation manager 560, in turn, invokes the appropriate application (e-mail application 510, IM application 520, social network application 530, etc.) to cause the appropriate application to perform a geofencing action on the mobile device (e.g. display information or content, create, modify, delete, or obtain data, change a device setting, send a command to a hardware component on the device, etc.). In other words, the invocation manager executed by the processor invokes an application 510, 520, 530 on the mobile device in response to an action signal from the geofence daemon.

In one implementation of the system of FIG. 5, the geofence server supports various types of geo data, e.g. places, geolayers, ad-hoc groups, etc. Place data may, in one implementation, be consolidated in the places server 31.

The geofence service architecture presented by way of example in FIG. 5 may operate in a client-server mode, as discussed above, although in another implementation the geofence service may operate in a pseudo P2P (peer-to-peer) mode.

In another implementation, the comparison of location data with geofences may be performed wholly or partially at the mobile device. Accordingly, another inventive aspect of the disclosure is a method, performed by a mobile device, of using geofences to obtain data pertinent to people, places or entities within areas circumscribed by one or more of the geofences. Such a method entails receiving geofences at the device and optionally storing these in non-volatile memory on the device, generating current location data representing a current location of the mobile device, comparing the current location data with each of a plurality of geofences to determine whether data is to be obtained from one or more servers associated with each of the geofences and, if the data is to be obtained, obtaining the data from the one or more servers by transmitting a request to a geofencing server that obtains the data from the one or more servers and then transmits the data back to the mobile device. In this implementation, the mobile device determines if a geofence condition is met (e.g. a geofence boundary has been crossed) and then makes a request to the geofencing server 20 to obtain on behalf of the mobile device all of the data it requires for the area defined by the geofence. The geofencing server 20 determines the address(es) for the server(s) having the requested data and obtains this data for the mobile device. Thus, the geofencing server mediates between the mobile device and the servers having the data for the areas defined by the geofences.

Comparing of location to the boundaries of geofences (to determine if a geofence condition is met) may, in one embodiment, be performed in response to detecting a signal from a wireless transmitter. For example, the device may detect a signal from a nearby Bluetooth®, Wi-Fi™, NFC or other short-range wireless transmitter or from a cellular base station or from a satellite transmitter, etc. This detection may trigger a comparison of location with geofences although, in other embodiments, the detection may be performed in response to user input, or it may be periodically or intermittently performed based on a schedule or other factors.

Receiving the geofence may be done from a local geofence transmitter that broadcasts (advertises) the availability of a local geofence. For example, the mobile device may detect a Bluetooth, Wi-Fi or other short-range transmitter at or near a bus station that is broadcasting a geofence for obtaining bus stop timetables that are dynamically updated based on real-time bus location data. In response to receiving this broadcast geofence from the local bus stop transmitter, the mobile device determines if the user really is waiting at the bus stop (e.g. by observing the current location and the time elapsed at that current location) in which case the mobile device may request the bus timetable server to provide the required data (i.e. bus timetable information). The request may be sent to the geofencing server with an indication of the address (e.g. URL or IP address) of the bus timetable server or other identifier for identifying the bus timetable server which may be obtained from the local bus stop transmitter. This example illustrates how local transmitters broadcasting locally applicable geofences may be received by the mobile device and used as a trigger to request data for the locally applicable geofence.

In yet another implementation, there may be more than one geofencing server, e.g. one per country, province, state, city, or other geographical entity, in which case the mobile device makes an initial determination, e.g. based on location, as to which geofencing server to contact for obtaining geofence data.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method performed by a computing device having a processor operatively coupled to a memory, the method comprising:
    obtaining a plurality of geofences along with addresses of servers associated with each of the geofences;
    receiving current location data from a mobile device, the current location data representing a current location of the mobile device;
    comparing the current location data with each of the plurality of geofences to determine whether data is to be obtained from one or more of the servers associated with each of the geofences;
    if the data is to be obtained, obtaining the data from the one or more servers;
    transmitting the data to the mobile device, wherein the data comprises a plurality of device-executable actions to be executed by the mobile device; and
    resolving conflicts between the actions.

2. The method as claimed in claim 1 wherein the device-executable actions comprise instructions to activate or deactivate a hardware component.

3. The method as claimed in claim 1 wherein the data comprises location-based content.

4. The method as claimed in claim 1 wherein at least one of the device-executable actions comprises instructions to invoke an application on the mobile device.

5. The method as claimed in claim 1 further comprising prioritizing geofences.

6. The method as claimed in claim 1 wherein obtaining the data comprises sending an anonymous request as a proxy server on behalf of the mobile device.

7. The method as claimed in claim 1 further comprising storing the geofences in a memory of the computing device.

8. A non-transitory computer-readable medium comprising instructions in code which when loaded into a memory and executed by a processor of a computing device cause the computing device to:
    obtain a plurality of geofences along with addresses of servers associated with each of the geofences;
    receive current location data from a mobile device, the current location data representing a current location of the mobile device;
    compare the current location data with each of the plurality of geofences to determine whether data is to be obtained from one or more of the servers associated with each of the geofences; and
    if the data is to be obtained, obtain the data from the one or more servers; and transmit the data to the mobile device, wherein the data comprises a plurality of device-executable actions to be executed by the mobile device; and resolve conflicts between the actions.

9. The computer-readable medium as claimed in claim 8 wherein the data comprises instructions to activate or deactivate a hardware component.

10. The computer-readable medium as claimed in claim 8 wherein the data comprises location-based content.

11. The computer-readable medium as claimed in claim 8 further comprising prioritizing geofences.

12. The computer-readable medium as claimed in claim 8 wherein obtaining the data comprises sending an anonymous request as a proxy server on behalf of the mobile device.

13. The computer readable medium as claimed in claim 8 further comprising storing the geofences in a memory of the computing device.

14. A geofencing server comprising:
a communication port for obtaining a plurality of geofences along with addresses of content servers associated with each of the geofences and for receiving current location data from a mobile device, the current location data representing a current location of the mobile device; and
a processor, which is operatively coupled to the memory and to the communication port, for comparing the current location data with each of the plurality of geofences to determine whether data is to be obtained from one or more of the content servers associated with each of the geofences and if the data is to be obtained, to cause the geofencing server to obtain the data from the one or more content servers and, upon receipt of the data, to cause the geofencing server to transmit the data to the mobile device, wherein the data comprises a plurality of device-executable actions to be executed by the mobile device, wherein the processor also resolves conflicts between device-executable actions.

15. The geofencing server as claimed in claim 14 wherein the data comprises device-executable actions to be executed by the device to activate or deactivate a hardware component.

16. The geofencing server as claimed in claim 14 wherein the data comprises location-based content.

17. The geofencing server as claimed in claim 14 wherein the processor is configured to prioritize geofences.

18. The geofencing server as claimed in claim 14 wherein the data is obtained by the processor generating and causing the communication port to send an anonymous request on behalf of the mobile device.

19. The geofencing server as claimed in claim 14 further comprising a memory for storing the plurality of geofences along with the addresses of content servers associated with each of the geofences.

20. A mobile device comprising:
a memory coupled to a processor for executing a geofence daemon that is configured to trigger a geofencing action in response to receiving a geofence condition notification from a geofence server that stores a plurality of geofences along with the addresses of content servers associated with each of the geofences;
a location manager executed by the processor for providing location data to the geofence daemon for communicating to the geofence server; and
an invocation manager executed by the processor for invoking an application on the mobile device or activating or deactivating a hardware component in response to an action signal from the geofence daemon,
wherein the processor is configured to resolve conflicts between the multiple contradictory action signals received by the mobile device.

21. The mobile device as claimed in claim 20 comprising a geofence application interfacing with the geofence daemon for creating geofences.

22. A method, performed by a mobile device, of using geofences to obtain data, the method comprising:
receiving a plurality of geofences;
generating current location data representing a current location of the mobile device;
comparing the current location data with each of the plurality of geofences to determine whether data is to be obtained from one or more servers associated with each of the geofences;
if the data is to be obtained, obtaining the data from the one or more servers by transmitting a request to a geofencing server that obtains the data from the one or more servers and then transmits the data back to the mobile device, wherein the data comprises a plurality of device-executable actions to be executed by the mobile device; and
resolving conflicts between the actions.

23. The method as claimed in claim 22 wherein comparing is performed in response to detecting a signal from a wireless transmitter.

* * * * *